Patented Jan. 6, 1931

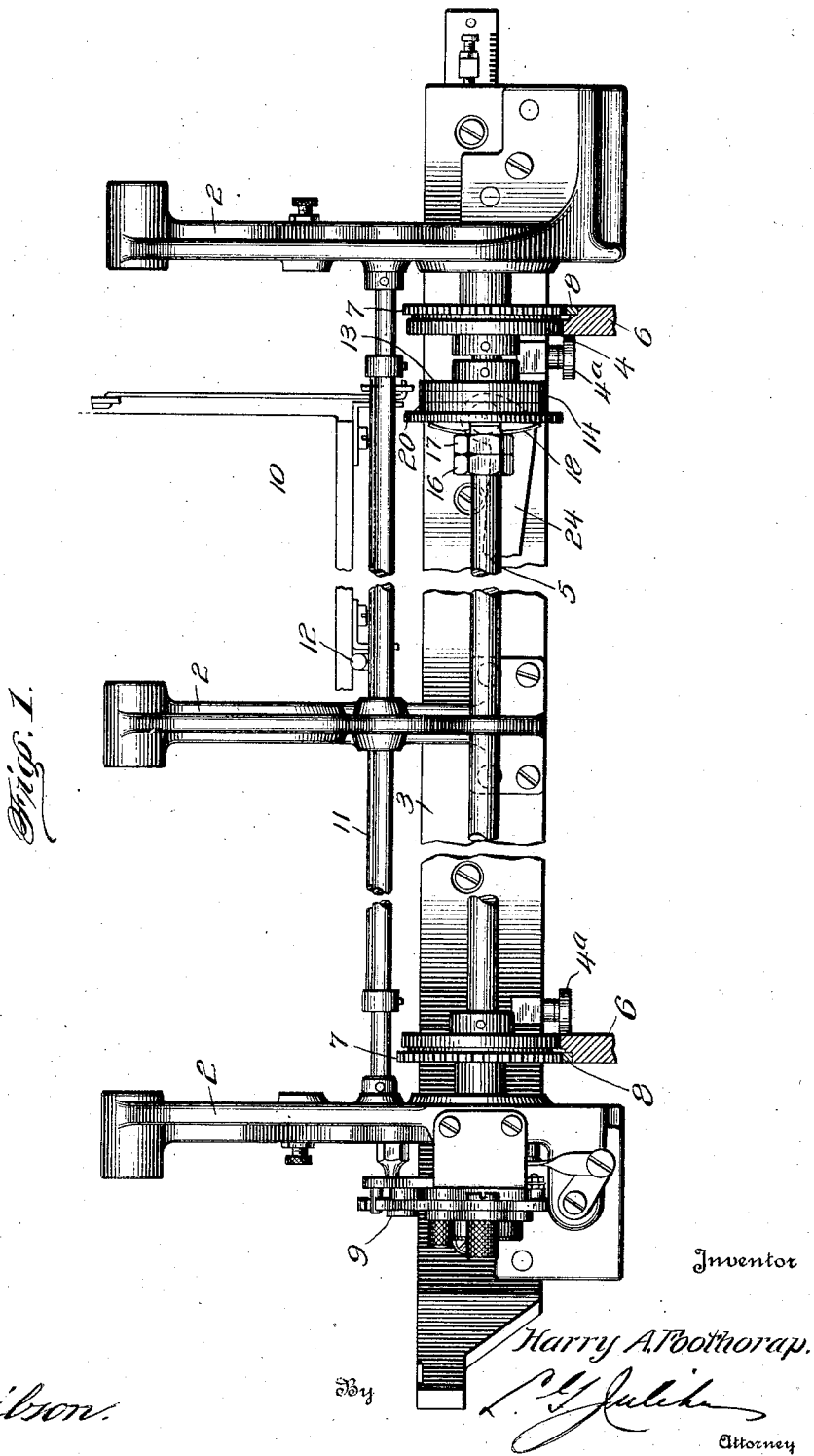

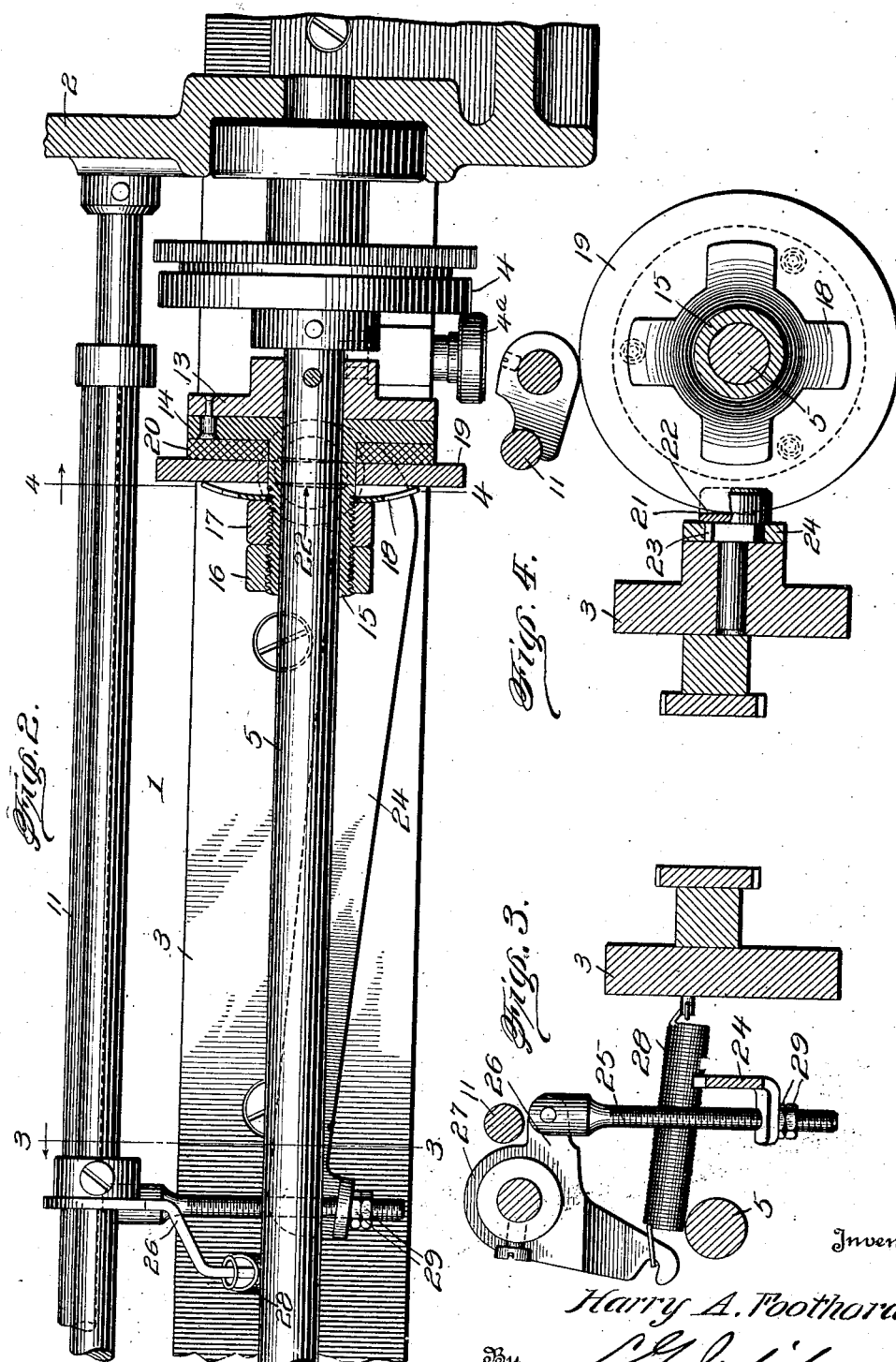

1,787,573

UNITED STATES PATENT OFFICE

HARRY A. FOOTHORAP, OF HARRISBURG, PENNSYLVANIA, ASSIGNOR TO ELLIOTT-FISHER COMPANY, OF NEW YORK, N. Y., A CORPORATION OF DELAWARE

BRAKE MECHANISM FOR TYPEWRITING MACHINES

Original application filed March 25, 1927, Serial No. 178,349. Divided and this application filed April 4, 1929. Serial No. 352,489.

My invention relates to billing machines and more particularly to improvements in carriage brake mechanism for such machines.

The particular object of my invention is to provide a carriage brake mechanism of greater flexibility than the present brake mechanisms, particularly as regards effecting variations in braking pressure, to simplify the construction of such mechanisms, and provide an organization of parts which can be easily and inexpensively manufactured.

Other objects will appear during the course of the succeeding description.

In the accompanying drawings:

Figure 1 is a view in rear elevation, of a line space carriage equipped with my improved brake mechanism, Figure 2 is a similar, fragmentary view, on an enlarged scale, showing parts in section, Figure 3 is a transverse sectional view taken on the line 3—3 of Figure 2, and Figure 4 is a transverse sectional view taken on the line 4—4 of Figure 2.

In the illustrated embodiment of my invention the brake mechanism has been shown as part of the equipment of the line space frame of the Elliott-Fisher billing machine of commerce. For a detailed understanding of the relation of this frame to the machine attention is directed to my copending application Serial No. 178,349, filed March 25, 1927, now Patent No. 1,719,176, dated July 2, 1929, of which the present application is a division.

It is sufficient in the present instance to say that the line space frame designated 1 includes frame brackets 2 and suitable connecting bars one of which is shown at 3. Supporting rolls, as shown at 4, fast upon a line space shaft 5, support the frame 1 upon side rails 6 forming part of the well known structure of these machines for supporting a flat platen not shown. The numeral 4a designates the usual guide rolls, the purpose of which will be understood. The line space shaft 5 has fast therein gears 7 meshing with racks 8 upon the side rails 6 and by means of which the frame 1 is propelled in a line space direction. The shaft 5 is driven to line space the frame 1 by line spacing mechanism shown generally at 9 and in detail in my copending application Serial No. 352,488, filed April 4th, 1929. As will be understood the line space frame 1 supports upon the before-mentioned connecting bars 3 the usual letter space carriage of the Elliott-Fisher machine, indicated at 10, and including printing mechanism not shown, all of which being well known in the art need not be further described herein.

It is usual in this type of machine to provide the line space frame with a brake, which securely retains the printing mechanism in accurate printing position. This mechanism is associated with the brake release bail 11 operated by a brake release key on the carriage, through the medium of a bail operator 12 as indicated in Figure 1 of the drawings.

In accordance with my present improvement the brake includes a disc 13 pinned to the shaft 5 and fixed to a second disc 14, having an elongated hub 15 threaded to receive nuts 16 and 17 constituting a backing for a spring spider 18, designed to urge a brake disc 19 into frictional engagement with a rubber, fabric or other friction disc 20 interposed between the discs 14 and 19.

It is obvious that if the disc 19 is held against rotation material frictional resistance will be opposed by it to the rotation of the shaft 5. Therefore, mounted on the rear frame member is a rocking retarding member 21 having a transverse slot 22 which receives the edge of the disc 19, but is of slightly greater width than the thickness of the disc. The stem of the member 21 has an annular portion 23 engaged by a brake lever 24 connected at its opposite end by means of a link 25 with one arm 26 of the lever 27 fixed to the brake releasing bail 11. Normally, the spring 28, which retains the bail in its elevated position serves to elevate the outer end of the lever 24 for the purpose of turning the retarding member 21 sufficiently to clamp and retard the disc 19. The link 25 is threaded to receive nuts 29 whereby the brake lever 24 and member 21 may be adjusted to vary the clamping action of the latter on the disc 19. By manipulating the nuts 16 and 17 the frictional engagement between the brake disc 19 and friction disc 20 may also be varied as will be clear.

It is thought that from the foregoing the construction of the improvements effected by me will be clearly understood, but I reserve the right to effect such modifications of the illustrated structure as may come fairly within the scope of the appended claims.

What I claim is:

1. The combination with a line space frame, of a line space shaft, friction discs rotatable with the shaft, and a rocking retarding member having a slot for the reception of the edge of one of the discs to hold and release said disc.

2. The combination with a line space frame, of a line space shaft, a friction member fixed to the shaft, a second friction member loose on the shaft, a spring urging one of the friction members toward the other, a rocking retarding member receiving the edge of one of the friction members, and means for rocking the retarding member to resist the movement of the engaged friction member with the shaft.

3. The combination with a line space frame, of a line space shaft, a disc pinned to the shaft, a second disc fixed to the first disc, and having an elongated hub, a third disc mounted on the hub, a friction disc interposed between the second and third discs, a spring urging the third disc toward the second disc, a rocking retarding member having a slot receiving the edge of the third disc, and means for operating the rocking member to hold or release the third disc.

4. The combination with a line space frame, of a line space shaft, a disc on said shaft, a rocking retarding member having a slot receiving the edge of the disc, means for operating the rocking retarding member to clamp or release the disc, and means for effecting variations in the clamping action of said retarding member.

5. The combination with a line space frame, of a line space shaft, a friction disc fast on the shaft, a second friction disc loose on the shaft, means for urging said discs into frictional engagement and including devices for varying the degree of such engagement, a rocking retarding member having a slot receiving the edge of one of said discs, means for operating the retarding member to clamp or release said disc, and means for effecting variations in the clamping action of said retarding member.

In testimony whereof I have affixed my signature.

HARRY A. FOOTHORAP.